United States Patent [19]
Markley et al.

[11] Patent Number: 6,133,415
[45] Date of Patent: Oct. 17, 2000

[54] PROCESS FOR MAKING POLYURETHANE PREPOLYMERS

[75] Inventors: Thomas John Markley, Blandon; Lloyd Mahlon Robeson, Macungie, both of Pa.

[73] Assignee: Air Products and Chemicals, Inc., Allentown, Pa.

[21] Appl. No.: 09/337,054

[22] Filed: Jun. 21, 1999

[51] Int. Cl.[7] .................................................. C08G 18/10
[52] U.S. Cl. .............................. 528/497; 528/76; 560/26; 560/115; 560/158
[58] Field of Search ......................... 528/76, 497; 560/26, 560/115, 158; 252/182.22

[56] References Cited

U.S. PATENT DOCUMENTS

| | | | |
|---|---|---|---|
| 4,288,577 | 9/1981 | McShane, Jr. | 525/453 |
| 4,683,279 | 7/1987 | Milligan et al. | 528/67 |
| 4,786,703 | 11/1988 | Starner et al. | 528/63 |
| 4,871,828 | 10/1989 | Blind et al. | 528/44 |
| 5,051,152 | 9/1991 | Siuta et al. | 203/49 |
| 5,202,001 | 4/1993 | Starner et al. | 203/49 |
| 5,703,193 | 12/1997 | Rosenberg et al. | 528/44 |

FOREIGN PATENT DOCUMENTS

| | | |
|---|---|---|
| S55-29083 | 8/1980 | Japan . |

*Primary Examiner*—Rachel Gorr
*Attorney, Agent, or Firm*—Mark L. Rodgers

[57] ABSTRACT

Polyurethane prepolymer which can be converted into a final product by reaction with a curative or chain extending agent is made by reacting polyisocyanate with polyol in the presence of an amount of an aliphatic hydrocarbon which is a solvent for the polyisocyanate but a non-solvent for the prepolymer. In order to minimize the formation of unwanted oligomers the polyisocyanate is present in stoichiometric excess with respect to the polyol and the amount of hydrocarbon solvent present in the reaction mixture is limited so that a single liquid phase is present in the mixture during most of the synthesis. Solvent containing dissolved isocyanate is then removed from the prepolymer by liquid phase separation. A portion of the solvent can be distilled from this isocyanate solution for use in liquid—liquid extraction of residual isocyanate from the prepolymer, and the remaining solution of isocyanate in hydrocarbon solvent can be used in prepolymer synthesis. A preferred method of liquid—liquid extraction of unreacted polyisocyanate from prepolymer is by counter-current flow of the prepolymer and hydrocarbon solvent through a vertically elongated contact column. This technique can be used independently or in combination with the use of hydrocarbon solvent in the prepolymer synthesis.

20 Claims, No Drawings

PROCESS FOR MAKING POLYURETHANE PREPOLYMERS

BACKGROUND OF THE INVENTION

This invention relates to a process for making polyurethane prepolymers. In another aspect it relates to a method of removing unreacted isocyanate from urethane prepolymer. In still another aspect it relates to a method of preparing a urethane prepolymer using a stoichiometric excess of polyisocyanate but obtaining low amounts of oligomers and free diisocyanate in the product.

Urethane polymers such as polyurethane and polyurethane/urea elastomer form a very significant part of the synthetic polymer industry worldwide. In the formation of such products it is common to prepare a prepolymer by reacting a polyisocyanate with a polyol, generally in a ratio of two molecules of isocyanate to one mole of diol. In preparing the product for its ultimate use, this prepolymer is reacted with a chain extending agent, such as a short chain diol or aromatic diamine to produce the final product in the form of a polyurethane or urethane/urea polymer. These urethane polymers are useful in a variety of applications such as in protective coatings and molded articles.

The prepolymer made up predominantly of the 2:1 isocyanate/diol combination is the most desirable product but it is difficult to obtain in high yields. One reason for this problem is the occurrence of competing side reactions that join these monomers in different ratios, such as 3:2, 4:3, or 5:4 molecules of isocyanate to molecules of diol. In order to reduce the tendency of the process to form such oligomers, operators have used an excess of the isocyanate beyond the 2:1 stoichiometric requirement. If this is done, however, the prepolymer product contains unreacted isocyanate that must be removed without harm to the prepolymer itself. Free isocyanate in the product adversely affects the stability of the product and presents health problems because of the toxicity of the free isocyanate. Attempts to solve this problem have been the subject of considerable industrial research, as is apparent from the following cited references.

As early as 1980 a Japanese Patent Application of Matsui et al., No. S55-29083 was opened to public inspection disclosing the use of certain aliphatic hydrocarbon solvents, such as n-heptane, n-hexane, n-octane, 3-methylpentane, and 3-ethylpentane alone or mixed with aromatic hydrocarbons such as benzene and toluene to extract unreacted isocyanate from a prepolymer made by reacting $\omega$, $\omega'$-diisocyanate dimethylcyclohexane with a low molecular weight polyol in a ratio of NCO/OH in the range of 2 to 10, preferably 5 to 8. It is said that the prepolymer formation can be carried out either without a solvent of in the presence of a solvent such as ethyl acetate, tetrahydrofuran, dimethylformamide, methylethylketone, and dioxane. The low molecular weight polyols disclosed all have very low molecular weights under 250 g/mol, such as 1,3-butylene glycol, 2-methyl-2,4-hexane diol, trimethylol propane, glycerin, trimethylol butane, 1,2,6-trimethylol hexane, pentaerythritol, and sorbitol. The stated object is to convert such prepolymers into films having good weather resistance.

U.S. Pat. No. 4,288,577, McShane, Jr. (1981) is directed to curing agents for urethane prepolymers but gives an example of preparing a prepolymer from methylenebis(4-phenyl isocyanate) (MDI) and polytetramethylene ether glycol (PTMEG) having a molecular weight of 1000. The mole ratio of isocyanate to diol was only 3:1 which is insufficient to insure that oligomers will not form. It is said that the product was extracted with hexane until essentially no isocyanate was found in the last extract. The extraction technique is not described, nor is it stated how much free isocyanate remained in the prepolymer.

A prepolymer process which deals more directly with the avoidance of oligomers is disclosed by Milligan et al. in U.S. Pat. No. 4,683,279, (1987). In this process short chain diols are condensed with a mixture of 2,4- and 2,6-toluenediisocyanates, preferably in isocyanate to diol mole ratios of 4:1 to 30:1. The reaction can be carried out in a suitable solvent such as acetone, dioxane, THF, and the like, and oligomer formation is said to be minimized. The unreacted isocyanate is removed by distillation, for example in a wiped film evaporation apparatus. We have found that wiped film evaporation (WFE) technology works well with low melting prepolymers such as those of Milligan et al., but is difficult to use with highly viscous polymers or with prepolymers having lower volatility isocyanates. A similar disclosure appears in U.S. Pat. No. 4,786,703, Starner et al. (1988) where WFE is recommended for removal of TDI to a level in the prepolymer of less than 0.15 weight percent. The prepolymer is essentially a 2:1 isocyanate/diol adduct.

Various other solutions to the problem of unreacted isocyanate (NCO) in such prepolymers have been suggested, as in U.S. Pat. No. 4,871,828, Blind et al. (1989) which proposes extracting the isocyanate with an inert gas such as $CO_2$ in a liquid or supercritical state. These inventors recognized that prior art extractions had used hexane or octane as the extractant, but stated "extractions with a solvent for the diisocyanate but which is a nonsolvent for the condensate (such as hexane, octane, etc.) is lengthy and cumbersome. In fact, as soon as the nonsolvent is added, the condensate tends to precipitate in the form of a sticky mass from which the free diisocyanate monomer is difficult to extract completely." U.S. Pat. No. 5,051,152, Siuta et al. (1991) combines wiped film evaporation with use of an inert sweeping gas to remove unreacted isocyanate. An improvement on this technique is disclosed by Starner et al. in U.S. Pat. No. 5,202,001 (1993) whereby the inert gas is passed through a quantity of prepolymer which has passed through the evaporation zone and then the gas is passed through the evaporation zone in a flow countercurrent to that of the polymer.

The seriousness with which this problem is viewed is illustrated by U.S. Pat. No. 5,703,193, Rosenberg et al. (1997) which describes a complicated distillation of the prepolymer in the presence of two solvents. One of the solvents must have a boiling point below that of the diisocyanate and the other solvent must boil above the diisocyanate. Distillation is carried out in an agitated thin film evaporator or similar apparatus. Suitable lower boiling solvents include expensive compounds as trichlorobenzenes, methyl or ethyl adipates, N-methylpyrollidone, and dibutylgluterate. Suitable higher boiling solvents include dimethylphthalate, dibutyladipate and Sulfolane® of Phillips Petroleum Co. These solvents can be present during the prepolymer synthesis in amounts ranging from 5 to 85 weight percent of the reaction mixture. It is clear from the foregoing references that a simple, inexpensive method of removing residual isocyanate from urethane prepolymer is very much needed.

BRIEF SUMMARY OF THE INVENTION

According to our invention a urethane prepolymer is prepared by reacting together a polyisocyanate and a polyol in the presence of a limited amount of an aliphatic hydrocarbon solvent to form a reaction mixture containing hydrocarbon solvent, unreacted isocyanate and urethane prepolymer suitable for further reaction with a curative or a chain extension agent. The aliphatic hydrocarbon is a solvent for the polyisocyanate but a non-solvent for the prepolymer. In the process this reaction mixture is subjected to conditions of temperature, pressure, and concentration which cause said isocyanate to dissolve in the hydrocarbon solvent. While both the diol and the prepolymer are miscible with the isocyanate, addition of the hydrocarbon solvent for the isocyanate has been found to reduce the miscibility of the reactants and product. It is desirable, therefore, to control the amount of hydrocarbon solvent added as a proportion of the total reaction mixture so that separate phases are not formed during the prepolymer synthesis. In general, the solvent should not exceed 50 volume percent of the mixture, and is preferably less than 30 volume percent. Thereafter, the solvent containing dissolved isocyanate is separated from the prepolymer.

In a preferred embodiment of the invention, the isocyanate is then separated from a sufficient amount of the solvent by distillation so that isocyanate and the remaining solvent can be reused in a prepolymer synthesis without exceeding the desired proportion of hydrocarbon solvent in the prepolymer reaction mixture. In this way a stoichiometric excess greater than 4:1 of the isocyanate over the polyol can be used to reduce the tendency of the reaction to produce unwanted oligomers and the unreacted isocyanate is readily removed from the prepolymer by the solvent used in the polymer synthesis stage of the process. Distilled solvent can then be used to remove more residual isocyanate from the prepolymer by liquid—liquid extraction.

Another aspect of our invention solves the problem of minimizing oligomers and free isocyanate in the prepolymer by counter-current liquid—liquid extraction of unreacted isocyanate from the prepolymer with a hydrocarbon solvent in a vertically elongated contact column. Using a stoichiometric excess of polyisocyanate with respect to the polyol minimizes the formation of oligomers. Preferably the equivalent ratio of NCO to OH in the reactants is at least 4:1 up to 100:1 and more desirably is in the range of 8:1 to 25:1. Very high levels of isocyanate are used to lower viscosity, improve mass transfer, and maintain a single phase during the reaction. Even with such an excess of the polyisocyanate in the prepolymer synthesis, unreacted isocyanate is efficiently removed by counter-current liquid—liquid extraction using an aliphatic hydrocarbon which is a solvent for the isocyanate but a non-solvent for the prepolymer. We have found that this extraction is very efficient in removing the free isocyanate without causing oligomerization or polymer decomposition. Ideally the prepolymer flows downwardly through the column while the extracting solvent flows upwardly with mixing action in the column to cause the prepolymer to be thoroughly mixed with but not dissolved in the solvent. This aspect of the invention can be practiced independently or in combination with the aspect in which hydrocarbon solvent is used in the prepolymer synthesis.

DETAILED DESCRIPTION OF THE INVENTION

The presence of oligomers and free isocyanate in urethane prepolymers presents a continuing challenge to polyurethane producers in the chemical industry. While the removal of unreacted isocyanate from prepolymers by evaporation is not a problem in those cases in which the isocyanate has a relatively high vapor pressure and/or the prepolymer has a low viscosity, the separation of isocyanate from prepolymer is much more troublesome when the opposite is true. In fact, removal of unreacted isocyanate from a highly viscous prepolymer and/or any prepolymer when the isocyanate has a relatively low vapor pressure has proven to be quite difficult, especially with evaporative techniques such as in the use of thin or wiped film evaporators. This problem cannot be solved simply by raising the temperature to reduce polymer viscosity and/or vaporize and drive off the free isocyanate because the isocyanate tends to dimerize and also degrade the prepolymer. Also such dimer tends to precipitate in the evaporator system and require costly clean up procedures. On the other hand, use of extractive solvents, such as hexane, to separate the unreacted isocyanate from the prepolymer has proven to be a lengthy and cumbersome procedure, as pointed out in the '828 patent cited above, and has not been commercially viable.

We have now found a procedure by which the use of aliphatic hydrocarbons such as hexane and heptane can be used quite successfully to remove unreacted isocyanate from a urethane prepolymer without creating excessive amounts of unwanted oligomers in the product and without introducing procedural problems related to the recovery and reuse of reactants. According to one aspect of our invention, a urethane prepolymer is made by a reaction between a polyisocyanate monomer and a high molecular weight polyol to form a product which is essentially an adduct containing only one molecule of the polyol in each prepolymer molecule. In order to minimize the formation of higher oligomers containing two or more molecules of the polyol per molecule of prepolymer, the equivalent proportions of isocyanate and polyol must be at least 4:1 up to 100:1 NCO:OH. Preferably, the operating ratio of NCO to OH fed to the reaction is in the range of 8:1 to 25:1. Since the stoichiometric proportions for the reaction are 2:1 NCO:OH in the case of diols and 3:1 for triols, this operating ratio represents a substantial excess of isocyanate over the polyol, but is necessary to minimize oligomer formation. In many applications, the preferred method is to remove the excess isocyanate which remains unreacted from the prepolymer before it is used in an application with a curing or chain extending agent.

In this aspect of the invention, the prepolymer formation is carried out in the presence an aliphatic hydrocarbon which is a solvent for the isocyanate but not for the polyol or the prepolymer. This is a radical departure from prior art methods which carry out prepolymer formation in a solvent in which the prepolymer as well as the reactants dissolves. We have found that by limiting the amount of hydrocarbon solvent in the system, a single-phase reaction mixture can be maintained over most of the course of the reaction. It is believed that this result is achieved because the excess isocyanate, by being miscible with both the polyol and the prepolymer, helps to maintain the single phase. A single phase for this reaction is desirable in order to keep the effective ratio of NCO to OH high and thereby hold down oligomer formation. The proportion of hydrocarbon in the reaction mixture should be sufficient to effect the extraction of unreacted isocyanate in a subsequent step, but not enough to cause phase separation of the reaction mixture early in the process. In general, the proportion of hydrocarbon solvent should not exceed 50 volume percent of the mixture and is preferably less than 30 volume percent.

After the prepolymer formation is complete, the hydrocarbon in the reaction mixture may be separated from the prepolymer, with cooling if necessary, so that the hydrocarbon and unreacted isocyanate are removed together from the prepolymer. A portion of hydrocarbon is distilled from the hydrocarbon/isocyanate solution and reused, as necessary, to extract additional free isocyanate from the prepolymer until the free isocyanate content of the prepolymer reaches a desired level for the intended market. Generally this level of free isocyanate in the prepolymer is below 0.5 weight percent. The recovered unreacted isocyanate dissolved in hydrocarbon is then concentrated by distillation, if necessary, and can be reused in the prepolymer synthesis phase of the process. In this way, it is not necessary to separate fully the recovered isocyanate from its hydrocarbon extractant before the isocyanate is reused to form additional prepolymer. Any distillation of hydrocarbon from the isocyanate need only be that required to insure that phase separation does not occur prematurely in the prepolymer formation process.

Polyisocyanates that can be used in the prepolymer formation reaction include aromatic diisocyanates such as diphenylmethanediisocyanate (MDI), tetramethylenexylenediisocyanate, toluenediisocyanate, and the like; cycloaliphatic polyisocyanates such as cyclohexanediisocyanate, isophoronediisocyanate, dicyclohexylmethanediisocyanate, and the like; and linear aliphatic isocyanates such as hexamethylenediisocyanate, and the like. Virtually any di- or multifunctional isocyanate, including adducts and prepolymers of the foregoing, and any mixture of stereo or positional isomers can be used. Such polyisocyanates for polyurethane formation are well known in the art. MDI is the preferred isocyanate for the practice of this invention.

The polyols which can be used in the process of the invention include long chain polyester and polyether polyols, such as di- or multifunctional alkylene ether polyols, for example, poly(tetramethylene oxide) polyols, poly(propylene oxide) polyols, poly(ethylene oxide) polyols, and the like. Polyester polyols such as those formed by the reaction of aliphatic or aromatic dicarboxylic acids with glycols can also be used as the polyol component. Preferably the polyol is a diol or triol of relatively high molecular weight, for example, above 500 g/mol, and preferred are those diols and triols having a molecular weight of at least 750 g/mol. It is these high molecular weight diols and triols that produce the prepolymers for which this invention is particularly advantageous.

The solvents used in the pre polymer formation are aliphatic hydrocarbons having 4 to 10 carbon atoms, such as butane, pentane, hexane, heptane, octane, nonane and decane, including both branched isomers and straight chain hydrocarbons. Unsaturated alkenes can be used, but alkanes are favored. The preferred solvent is hexane.

The reaction conditions of temperature and pressure for pre polymer formation are generally those known in the art of polyurethane manufacture. The pressure is suitably atmospheric but should be sufficient to maintain the reaction mixture in a liquid phase. The temperatures can vary considerably but are normally in the range of about 50 to 100° C., preferably 70 to 90° C. Agitation of the mixture is required to insure that the effective contact proportions provide an excess of polyisocyanate to polyol.

When the reaction is complete, indicated by the consumption of the polyol, the hydrocarbon containing dissolved free isocyanate is removed from the prepolymer by phase separation. At this point the level of free isocyanate in the prepolymer can be low enough for some applications so that further extraction is not required. For most applications, however, it is desirable to separate a portion of the hydrocarbon from the free isocyanate by distillation, leaving a solution of isocyanate in hydrocarbon solvent that can be reused in the prepolymer synthesis step of the process. The separated hydrocarbon is then used for additional liquid-liquid extraction of the prepolymer in order to reduce the free isocyanate content of the prepolymer still further, as desired. At the end of this process, some hydrocarbon solvent is present in the prepolymer product, but the hydrocarbon is easily removed to a suitable level by evaporation because of the high vapor pressure of the hydrocarbon with respect to the prepolymer.

The conditions of the liquid—liquid extraction of free isocyanate from the prepolymer are not greatly different from those of the reaction. The pressure is sufficient to keep the materials in a liquid phase. Temperatures are generally in the range of 30 to 90° C., preferably 45 to 65° C. Agitation is required to assure a good dispersion of the prepolymer in the hydrocarbon for efficient liquid—liquid contact. The preferred mode of effecting such contact between the prepolymer and hydrocarbon is counter-current flow of the materials within a vertically elongated column provided with mixing means that creates the desired dispersion between the prepolymer and hydrocarbon extractant, preferably with the hydrocarbon as the continuous phase. Example 15 illustrates this preferred aspect of the invention which we have found to be very efficient and commercially practicable. While a Karr column having a reciprocating plate tower was used in Example 13, any countercurrent column design can be employed in this step of the process. In a typical vertical column, the preferred directions of material flow in the column are downwardly for the prepolymer and upwardly for the hydrocarbon as illustrated in Example 13. In such a case the prepolymer is introduced at or near the top of the column while the hydrocarbon is introduced at or near the bottom of the column. It was quite surprising that essentially complete separation of free isocyanate from the prepolymer could be effected in one pass through the column using this technique.

The urethane prepolymers that can be made by the processes of this invention include a wide range of viscosities, depending primarily upon the polyol selected. The prepolymer contains greater than 80 wt % of the desired 2:1 adduct and preferably greater than 90 wt % of the desired 2:1 adduct of the polyisocyanate and a diol, or 3:1 in the case of prepolymers made from triols. Furthermore, the prepolymer is essentially free of unreacted isocyanate as shown by the following Examples.

Other advantages and features of our invention will be apparent to those skilled in the art from the following examples which are illustrative only and should not be construed to limit our invention unduly.

EXAMPLE 1

In this run 4,4'- diphenylmethane diisocyanate (MDI) was removed by liquid—liquid extraction from a prepolymer made by reacting MDI with polytetramethylene ether glycol (PTMEG) having a number average molecular weight of 1000. This prepolymer contained between 31–34 wt % free MDI and 12.8–13.2 wt % NCO, including both the free and combined MDI. The MDI to PTMEG mole ratio in the reactor charge was 4.3:1, the reaction temperature was 80° C., and the reaction time was 4 hours with agitation. The extraction vessel was kept under a blanket of $N_2$ at 50° C. Freshly distilled hexane was passed through the prepolymer solution at ~12 g/min while stirring the mixture and the hexane enriched with MDI was removed from the top of the extraction vessel and passed to a distillation flask. The run was stopped after an extraction ratio of 50:1 (grams of hexane per gram of prepolymer and MDI) was reached. The hexane was then decanted and the product was poured out of the extraction vessel into a round bottom flask. This was placed on a rotovap at 50° C. for 3 hours (the hexane content based on solids was 1.3 wt %). This Example shows that liquid/liquid extraction of MDI from a MDI/PTMEG prepolymer using hexane was successful, yielding a product with only 0.05 wt % free monomer and 4.35 wt % NCO.

EXAMPLE 2

100 g of poly(1,6 hexanediol adipate) having a MW=10,000 g/mol was heated to 75° C. to melt the diol. With mixing, 20 g MDI was added in one shot at an 8:1 ratio. This was allowed to react for 2.5 hours. The extraction conditions used were as follows: The reactor was kept under a blanket of $N_2$ at 65° C. With stirring, freshly distilled hexane was added to the prepolymer at ~12 g/min while the hexane enriched with MDI was removed from the top of the reactor and passed to a distillation flask. The run was stopped after an extraction ratio of 100:1 (g of hexane: g of prepolymer) was reached. The hexane was then decanted and the product removed from the reactor into a round bottom flask. This was placed on a rotovap at 65–70° C. for 5 hours to remove residual hexane. This prepolymer was found to contain 0.02 wt % free monomer. This run showed that MDI can be removed from very high viscosity prepolymers.

EXAMPLE 3

In order to obtain partition constants for MDI in the prepolymer vs. the hexane layer, a separate run was conducted in which 737 grams of the prepolymer of Example 1 was added to the extraction vessel along with 671 grams of hexane. The reactor was heated to 50° C. with good mixing and allowed to reach equilibrium over three hours. Stirring was then stopped and two layers were allowed to form. The top hexane layer was found to contain 8.62 wt % MDI and the bottom prepolymer layer was found to contain 22 wt % MDI. From this it was calculated that 162 grams of MDI was in the prepolymer and 58 grams of MDI was in the hexane.

EXAMPLE 4

In this run a glass batch reactor/extractor unit was used. This set up allowed fresh hexane to pass through the prepolymer. The hexane used for all Examples 1–13 was a mixture of hexane isomers identified as "Sure Seal" obtained from Aldrich Chemical Company. The hexane, which was less dense than the prepolymer, separated to form a top layer. During this process MDI monomer was extracted from the prepolymer, and the hexane layer rich in MDI overflowed into a round bottom flask which was heated to distill the hexanes from the MDI. This freshly distilled hexane was then recirculated back into the prepolymer for further extraction. The amount of hexane used in this operation was less than twice the amount of prepolymer subjected to extraction in the entire process. A bottom drain in the reactor allowed both the taking of samples during the run and removing the product afterward. All operations, including sampling, were run under a $N_2$ purge. A run without prepolymer was made in order to estimate that fresh hexane was coming into the reactor at a rate of 12 g/min.

In each hexane extraction 700 grams of the same type of prepolymer used in Example 1 was used, ~670 grams of hexane was added to the reactor and 540 grams of hexane was added to the round bottom flask, for a total hexane amount of 1210 grams used during the extraction. The reactor was held at 50° C. under a blanket of $N_2$, and hexane flowed through the reactor at 12 g/min until a 47:1 (g of hexane: g of prepolymer) ratio was reached. It is believed that better mixing of the hexane in the prepolymer would lead to an even better extraction efficiency. The concentration of MDI present in the prepolymer was determined at various extraction ratios over the course of the extraction. This process was repeated for a total of six runs, giving reproducible results each time with the extracted prepolymer containing <0.5 wt % MDI. Three of these samples were combined and the hexane, approximately 15 wt %, that remained in the extracted prepolymers was successfully removed (down to 0.04 wt %) using a two inch Pope still. This still was run at 60 torr and 100° C. The wt % NCO was found to be 4.82. The viscosity of the prepolymer was 1137 cps at 70° C.

EXAMPLE 5

MDI endcapped PTMEG 1000 based prepolymer was made at a 10:1 NCO:OH ratio. This prepolymer was prepared by adding 569.3 grams of PTMEG (MW=1000) into a reactor containing 1450.9 grams of MDI at 80° C. The polyol addition took just under 1 hour. The mixture was then stirred overnight at 80° C. The free MDI was extracted using the hexane extraction process described in Example 4. Although this 10:1 based prepolymer contained 57 wt % free MDI compared to 29–31 wt % for the prepolymer of Example 4, the extraction process took the same amount of time. This was accomplished by improving the mixing between the hexane and the prepolymer. This process was repeated twice, and samples were obtained from each containing <0.5 wt % free MDI. The hexane, approximately 15 wt %, that remained in the extracted prepolymers was successfully removed (0.03 wt % and 0.15 wt %) using a two inch Pope still. This still was run at 60 torr and 100° C. The wt % NCO was found to be 5.5 and 5.69 which is very close to the theoretical value of 5.6. A calculation made based on this information predicted only 5 wt. % oligomer to be present.

EXAMPLE 6

This Example and Examples 7 and 8 demonstrate that aspect of the invention in which hydrocarbon solvent is used in the prepolymer formation as well as for the extraction step. MDI endcapped PTMEG 1000 based prepolymer was made at a 10:1 NCO:OH ratio. This prepolymer was prepared by adding 294.3 grams of PTMEG (MW=1000) into a reactor containing 750 grams of MDI and 750 grams (1116 ml) of hexane at ~70° C. The polyol addition took just over 2 hours. The hexane made up ~60 volume percent of the reaction mixture. A transparent one phase solution was seen until ~50 % of polyol was added and then the solution became cloudy. This mixture was then stirred overnight at 70° C. The free MDI was extracted using the hexane extraction process described in Example 4. A sample was obtained containing <0.05 wt % free MDI. The hexane, approximately 15 wt %, that remained in the extracted prepolymers was removed down to 0.01 wt % using a two-inch Pope still. This still was run at 60 torr and 100° C. The wt % NCO was found to be 5.25. A calculation made based on this information predicted approximately 16–17 wt. % oligomer to be present. Although this oligomer content is less than 20 wt. % and, therefore, acceptable in many applications, it is desirable to obtain additional reduction of the oligomer content for most situations. This can be done by controlling the hexane levels in the reaction mixture as shown by Examples 8 and 9.

EXAMPLE 7

MDI endcapped PTMEG 1000 based prepolymer was made at a 10:1 NCO:OH ratio. This prepolymer was prepared by adding 294.3 grams of PTMEG (MW=1000) into a reactor containing 750 grams of MDI and 750 ml of hexane at ~70° C. The polyol addition took just over 1 hour. The hexane made up ~50 volume percent of the reaction mixture. A transparent one-phase solution was seen until ~80 % of polyol was added. Then the solution became cloudy. This mixture was then stirred overnight at 70° C. Stirring was then stopped and only one phase was seen until the solution was cooled to 50° C. whereupon two layers were seen. The free MDI was extracted using the hexane extraction process described in Example 4. A sample was obtained containing <0.05 wt % free MDI. The hexane, approximately 15 wt %, that remained in the extracted prepolymers was removed down to 0.74 wt % using a rotovap. The wt % NCO was found to be 5.3 wt %. A calculation, which was made based on this information, predicted approximately 13–14 wt. % oligomer to be present. Although this oligomer content is within an acceptable range, a still lower oligomer content is preferred.

EXAMPLE 8

MDI endcapped PTMEG 1000 based prepolymer was made at a 10:1 NCO:OH ratio. This prepolymer was prepared by adding 235.4 grams of PTMEG (MW =1000) into a reactor containing 600 grams of MDI and 240 ml of hexane at ~70° C. The polyol addition took just over 2 hours. This mixture was then stirred overnight at 70° C. The hexane made up just 28.6 volume percent of the reaction mixture. A transparent one-phase solution was seen throughout the entire reaction. The free MDI was extracted using the hexane extraction process described in Example 4. A sample was obtained containing <0.06 wt % free MDI. The hexane, approximately 15 wt %, that remained in the extracted prepolymers was removed down to 0.03 wt % using a two-inch Pope still. This still was run at 60 torr and 100° C. The wt % NCO was found to be 5.47. A calculation, which was made based on this information, predicted approximately 8 wt. % oligomer to be present. The viscosity of the prepolymer was 1,493 cP at 60° C., 897 cP at 70° C., 569 cP at 80° C., 380 cP at 90° C., 262 cP at 100° C., and 188 cP at 110° C. Examples 6, 7, and 8 demonstrate the advantage of limiting the volume percent of the hexane in the prepolymer reaction mixture in order to maintain a single phase during all or most of the reaction and thereby restrict oligomer formation.

EXAMPLE 9

MDI endcapped polyester-based prepolymer was made at a 10:1 NCO:OH ratio. This prepolymer was prepared by adding 988.8 grams of poly(1,6 hexanediol adipate) having a MW =3,620 g/mol into a reactor containing 1234.3 grams of MDI at ~80° C. The polyol addition took just over 2 hours. This mixture was then stirred overnight at 80° C. The free MDI was extracted using the hexane extraction process described in Example 4 except that the temperature was held at 65° C. A sample was obtained containing <0.04 wt % free MDI. The hexane that remained in the extracted prepolymers was removed down to 0.046 wt % using a rotovap under vacuum at 80° C. for ~6.5 hours. The wt % NCO was found to be 1.99. A calculation made based on this information predicted approximately 9–10 wt. % oligomer to be present. The viscosity of the prepolymer was 6,350 cP at 80° C., 3,000 cP at 100° C., 2,142 cP at 110° C., and 1,613 cP at 120° C.

EXAMPLE 10

This Example demonstrates preparation of a high viscosity prepolymer containing low residual isocyanate and very low oligomer content. MDI endcapped polyester-based prepolymer was made at a 10:1 NCO:OH ratio. This prepolymer was prepared by adding 500.2 grams of blended polyester diols (57.7 wt % Dynacoll 7360, 27.9 wt % Dynacoll 7230, and 14.4 wt % Dynacoll 7110, all from Huls Aktiengefellschaft) into a reactor containing 379 grams of MDI at ~80° C. The polyol addition took just over 2 hours. This mixture was then stirred overnight at 80° C. The free MDI was extracted using the hexane extraction process described in Example 4 except that the temperature was held at 60–65° C. A sample was obtained containing <0.5 wt % free MDI. The hexane that remained in the extracted prepolymers was removed down to 0.006 wt % using a two-inch Pope still. This still was run at 60 torr and 110° C. The wt % NCO was found to be 2.27. A calculation made based on this information predicted approximately 6 wt. % oligomer to be present. The viscosity of the prepolymer was 39,000 cP at 60° C., 22,250 cP at 70° C., 12,600 cP at 80° C., and 8,125 cP at 90° C.

EXAMPLE 11

A MDI endcapped polyester-based di-functional prepolymer was made at a 10:1 NCO:OH ratio. This prepolymer was prepared by adding 475 grams of poly(1,6 hexanediol adipate) having an OH number of 22 and a molecular weight of 5,100 g/mol into a reactor containing 250 grams of MDI at ~75° C. The polyol addition took just over 2 hours. This mixture was then stirred overnight at 75° C. The free MDI was extracted using the hexane extraction process described in Example 4 except the temperature was held at 63° C. A sample was obtained containing no measurable free MDI. The hexane that remained in the extracted prepolymers was removed down to 0.01 wt % using a two-inch Pope still. This still was run at 60 torr and 110° C. The wt % NCO was found to be 1.61 (theoretical wt % NCO =1.51). The viscosity of the prepolymer was 10,448 cP at 90° C., 7,518 cP at 100° C., and 5,504 cP at 110° C.

EXAMPLE 12

A MDI endcapped polyester-based tri-functional prepolymer was made at approximately a 10:1 NCO:OH ratio. This prepolymer was prepared by adding 488.5 grams of a triol based on poly(1,6 hexanediol adipate) having an OH number of 29.4 and a molecular weight of 6,000 g/mol into a reactor containing 320 grams of MDI at ~75° C. The polyol addition took just over 2 hours. This mixture was then stirred overnight at ~75° C. The free MDI was extracted using the hexane extraction process described in Example 4 except that the temperature was held at ~63° C. A sample of prepolymer was obtained containing 0.06 wt % free MDI. The hexane that remained in the extracted prepolymers was removed down to 0.64 wt % using a rotovap under vacuum at 80° C. for ~6.5 hours. The wt % NCO was found to be 1.89 (theoretical wt % NCO=1.95). A calculation made based on this information predicted approximately 8 wt. % oligomer to be present. The viscosity of the prepolymer was 61,588 cP at 80° C., 40,675 cP at 90° C., 31,638 cP at 100° C., 24,135 cP at 110° C., and 24,855 cP at 120° C.

EXAMPLE 13

This Example demonstrates the preferred counter-current extraction method for removing unreacted isocyanate from the prepolymer. MDI endcapped PTMEG 1000 based prepolymer was made at a 10:1 NCO:OH ratio. This prepolymer was prepared by adding 3,374 grams of PTMEG (MW=1000) into a reactor containing 8,600 grams of MDI at 80° C. The polyol addition took just over 5 hours. This mixture was then stirred overnight at ~80° C. The free MDI was extracted by hexane using a counter-current extraction process. The apparatus used for the counter-current extraction was a Karr column having a reciprocating plate tower with the mixing motion in the vertical direction. The column was one inch in diameter. The distance between the prepolymer feed at the top and the solvent feed at the bottom was three feet. The column had 34 plates containing four ¼ inch holes. Each plate was spaced one inch apart. The following conditions were used to lower the MDI concentration in the prepolymer in one pass through the column from 57 wt % to <0.25 wt % free MDI. The temperature of the column was held between 48–50° C., the prepolymer feed rate (containing 57 wt % free MDI) was held at 23 g/min, the stroke rate of the reciprocating plates was held at 310 strokes/min, and the hexane flowed upwardly through the column (counter-current to the prepolymer) at a rate of ~100 g/min. The hexane, approximately 10–15 wt %, that remained in the extracted prepolymers was successfully removed down to <0.08 wt % using a two-inch Pope still. This still was run at 60–100 torr and 100° C. The wt % NCO was found to be 5.9 (theoretical wt % NCO=5.68). The viscosity of the prepolymer was 1,531 cP at 60° C., 905 cP at 70° C., 569 cP at 80° C., 375 cP at 90° C., 260 cP at 100° C., 190 cP at 110° C., and 147 cP at 120° C.

Other embodiments of our invention will be apparent to those skilled in the art from the foregoing disclosure and the following claims without departing from the spirit or scope of the invention.

We claim:

1. A process for making urethane prepolymer which comprises:
   (a) reacting a stoichiometric excess of polyisocyanate with a polyol in the presence of an amount of aliphatic hydrocarbon which is a solvent for said polyisocyanate but a non-solvent for said prepolymer to form a reaction mixture containing solvent, unreacted polyisocyanate and urethane prepolymer suitable for further reaction with a curing or chain extension agent, said amount of solvent being limited so that liquid phase separation does not occur during most of the prepolymer synthesis; and
   (b) removing said solvent containing dissolved unreacted polyisocyanate from said prepolymer by liquid—liquid phase separation.

2. The process of claim 1 comprising the additional subsequent steps of:
   (c) separating a portion of said solvent from said dissolved unreacted polyisocyanate by distillation; and
   (d) contacting said portion of said solvent with said prepolymer under liquid—liquid extraction conditions to remove residual unreacted polyisocyanate from said prepolymer, thereby producing (i) a prepolymer product essentially free of unreacted polyisocyanate and (ii) a solution of unreacted polyisocyanate in hydrocarbon solvent, said solution being suitable for reuse in step (a).

3. The process of claim 2 wherein said solution of step (d) is used in a prepolymer synthesis according to step (a).

4. The process of claim 2 wherein said polyisocyanate is 4,4'-diphenylmethane diisocyanate.

5. The process of claim 2 wherein said hydrocarbon solvent is an aliphatic hydrocarbon having 4 to 10 carbon atoms.

6. The process of claim 5 wherein said solvent is hexane.

7. The process of claim 5 wherein said polyisocyanate is 4,4'-diphenylmethane diisocyanate and said polyol is a diol or triol having a molecular weight of at least 500 g/mol.

8. The process of claim 7 wherein said polyols are di- or multifunctional alkylene ether polyols or polyester polyols.

9. The process of claim 1 wherein said hydrocarbon solvent comprises not more than 50 volume percent of said reaction mixture.

10. The process of claim 5 wherein said hydrocarbon solvent comprises not more than 30 volume percent of said reaction mixture.

11. The process of claim 1 wherein a stoichiometric excess of said polyisocyanate with respect to said polyol is used in step (a) so that the equivalent ratio of NCO to OH is in the range of 4:1 to 100:1.

12. The process of claim 11 wherein said equivalent ratio is in the range of 8:1 to 12:1.

13. The process of claim 2 wherein a stoichiometric excess of said polyisocyanate with respect to said polyol is used in step (a) so that the equivalent ratio of NCO to OH is in the range of 4:1 to 100:1, said hydrocarbon solvent comprises not more than 30 volume percent of said reaction mixture and said prepolymer product contains greater than 80 wt % of the desired 2:1 isocyanate/polyol combination and less than 1.0 wt % free polyisocyanate.

14. The process of claim 2 wherein said contacting of step (d) is carried out by counter-current flow of said prepolymer and said solvent through a vertically elongated contact column.

15. A process for removing unreacted polyisocyanate from a polyurethane prepolymer made by reacting polyisocyanate with polyol which comprises contacting said prepolymer with an aliphatic hydrocarbon which is a solvent for said polyisocyanate but a non-solvent for said prepolymer under liquid—liquid extraction conditions by counter-current flow of said prepolymer and said hydrocarbon through a vertically elongated contact column.

16. The process of claim 15 wherein said solvent is a saturated hydrocarbon having from 4 to 10 carbon atoms.

17. The process of claim 16 wherein a stoichiometric excess of said polyisocyanate with respect to said polyol is used in the synthesis of said prepolymer so that the equivalent ratio of NCO to OH is in the range of 4:1 to 100:1.

18. The process of claim 15 wherein said prepolymer is introduced at or near the top of said column and flows downwardly and said solvent in introduced at or near the bottom of said column and flows upwardly.

19. The process of claim 18 wherein said column contains means for creating thorough mixing of said prepolymer within a continuous phase of said solvent and any solvent remaining in prepolymer withdrawn from the bottom of said column is removed by evaporation or distillation.

20. The process of claim 19 wherein said polyisocyanate is 4,4'-diphenylmethane diisocyanate, said polyols are di- or multifunctional alkylene ether polyols or polyester polyols, and said solvent is hexane.

* * * * *